United States Patent [19]

Petrella et al.

[11] Patent Number: 4,717,611

[45] Date of Patent: Jan. 5, 1988

[54] VOID-FREE MOLDED POLYURETHANE ARTICLES WITH SURFACE ATTACHMENT STRIPS

[75] Inventors: Robert G. Petrella, Allentown; Michael Scarpati, Lehighton, both of Pa.

[73] Assignee: Air Products and Chemicals, Inc., Allentown, Pa.

[21] Appl. No.: 942,903

[22] Filed: Dec. 17, 1986

[51] Int. Cl.$^4$ .......................... B29C 67/00; B32B 3/06
[52] U.S. Cl. ...................... 428/99; 264/46.4; 428/100; 428/101; 428/290; 428/297
[58] Field of Search ............... 264/46.4, 46.7; 428/99, 428/100, 101, 290, 297

[56] References Cited

U.S. PATENT DOCUMENTS

| | | | |
|---|---|---|---|
| 3,414,928 | 12/1968 | Lemelson | 428/100 |
| 3,861,993 | 1/1975 | Guthrie | 428/316.6 |
| 4,216,257 | 8/1980 | Schams et al. | 428/99 |
| 4,563,380 | 1/1986 | Black et al. | 264/46.7 |

Primary Examiner—William J. Van Balen
Attorney, Agent, or Firm—Michael Leach; James C. Simmons; William F. Marsh

[57] ABSTRACT

In a method for making a molded polyurethane article having a nonwoven material secured to the article's surface which comprises placing the nonwoven material on the internal surface of a mold, adding and foaming a polyurethane composition in the mold and recovering the molded polyurethane article with the nonwoven material attached to the surface of the article, the improvement which comprises coating the nonwoven material with a composition consisting essentially of a fully hydrolyzed polyvinyl alcohol, an organic polyisocyanate and a catalyst for the urethane reaction, and curing the coating on the nonwoven material prior to adding and foaming the polyurethane composition in the mold.

21 Claims, No Drawings

VOID-FREE MOLDED POLYURETHANE ARTICLES WITH SURFACE ATTACHMENT STRIPS

TECHNICAL FIELD

The invention relates to polyurethane foam articles containing as an integral part thereof, molded-in-place nonwoven attachment strips on the surface.

BACKGROUND OF THE INVENTION

Velcro strips are a cost reduction method of attaching seat coverings to polyurethane pads principally used by the automotive companies. These strips are attached to the polyurethane foam during the molding step simultaneously causing the cost reduction and a problem. The problem arises from the molded-in-place Velcro strips releasing air into the rising polyurethane foam during the molding step. This release of air produces large voids at the Velcro strip/foam interface adversely affecting the foam's quality, load bearing and adhesion to the Velcro strips. As an aid to understanding the problem, a brief description of the construction of a Velcro strip/polyurethane foam article composite follows:

The Velcro strip consists essentially of a network of molded plastic teeth and usually a nonwoven or knitted backing material. Only the backing material is important to the problem. For cost reasons, polyolefin fibers are predominantly used to make the backing fabric. Polyolefins, by their chemical nature, are non-polar materials characterized by low free energy surfaces. The nonwoven construction technique comprises piling fibers in a random manner to form a web. The fibers where they intersect are bonded together with a polymeric binder resulting in a vast number of air pockets, or voids, in the fabric. Knitted fabrics are constructed by looping the yarn together to form the fabric. The knitted fabric like the nonwoven fabric is characterized by a large number of voids. The problem would also be present with woven backing material.

In a process that takes place in approximately 40–50 seconds, the Velcro strips at ambient temperature are placed plastic mating teeth side down in the mold cavity. The mating teeth are covered by a thin plastic film to prevent coverage by the developing foam. The surface temperature of the mold is about 135°–155° F. depending upon the manufacturer's preference. Within 20 seconds after the strip is placed in the mold cavity, mixed liquid foam chemicals are poured into the mold. The pour pattern may or may not cover the Velcro strip with the liquid. The mold is closed and, within 5–6 seconds after pouring, the chemical reaction begins to convert the liquid into solid polyurethane foam. The rapidly expanding mass will fill the entire mold within 15–20 seconds after it is closed. During the filling process, the foam's viscosity and integrity is dramatically changing. It's viscosity changes from a liquid of a few hundred centipoise to a solid with a tensile strength of 10–15 lbs/in$^2$ within 2–6 minutes depending upon the mold temperature and foam chemicals.

As a chemical entity, polyurethane is highly polar being characterized by a high free energy surface. This disparity in surface free energy with that of the nonwoven backing material prevents the wetting of the polyolefin fibers by the polyurethane foam, i.e. prevents the displacement of the air entrapped in the voids of the nonwoven material. To compound the problem, the entrapped air is absorbing heat energy from the mold surface and the exothermic reaction that forms the foam. This heat energy adsorption causes the air pressure in the voids to rapidly rise and blow out at the time the foam strength is beginning to develop. The result is large voids at the Velcro strip/foam interface. To describe the problem semi-quantitatively, instead of having 6400–10,000 attachment points/in$^2$, the Velcro strip may have less than 100 attachment points/in$^2$, based on good quality foam having 80–100 cells/inch while the voids are ⅛ to ¼ inch in diameter.

One of the first approaches to solve this problem was to pretreat the nonwoven backing with various components of the liquid polyurethane foam composition. The idea was to displace the air by the liquid. It did not work because the highly polar liquid components were not able to wet the fibers.

A variety of surfactants were used to pretreat the nonwoven backing. Both anionic and nonionic surfactants were tested with partial success at levels from 0.1 to 1 wt.%. Nonylphenoxy poly(ethoxy)ethanol with an ethylene oxide content of 60 wt% significantly reduced the void size when tested at 0.2%, but the voids were not eliminated.

Solvent (acetone, ethyl alcohol, hexane, toluene and methylene chloride) extraction of the nonwoven backing fabric was also tried without success.

Both faster and slower, blowing and gelling catalyst changes were tried without success. Mechanical changes in the molds and altered pour patterns also were attempted without success. Even a vent directly above the Velcro strip to permit fast air release could not eliminate void formation.

SUMMARY OF THE INVENTION

The present invention relates to a method for making a molded polyurethane article having a nonwoven material, or fabric, especially a Velcro attachment strip, secured to the surface of the polyurethane article by positioning the nonwoven material on the internal surface of a mold, adding and curing a polyurethane composition in the mold, and recovering the molded polyurethane article with the nonwoven material secured to and as an integral part of the surface of the article. The present invention provides for polyurethane articles which are void free at the region of attachment of the nonwoven material by coating the nonwoven material with a composition consisting essentially of a polyvinyl alcohol, an organic polyisocyanate, a catalyst for the urethane reaction, optionally, a plasticizer for the polyvinyl alcohol and curing the coating on the nonwoven fabric prior to adding and curing the polyurethane composition in the mold.

For purpose of the description of the invention and the pending claims, whenever the term "nonwoven" is used it is to be understood that "knitted" and "woven" is also encompassed.

The invention provides a solution to the problem that can be carried out by the nonwoven material (Velcro strip) manufacturer prior to final assembly. Alternatively, the coating can be used as the nonwoven binder to bond the fibers of the nonwoven material, i.e. the fibers composing the backing of a Velcro strip.

During the application/curing steps, sufficient time exists to outgas the nonwoven material and fill or cover over the small voids.

The invention is particularly suitable for nonwoven, woven and knitted materials of synthetic fibers having a low surface free energy, i.e., less than about 30 dynes/cm for example, polyolefins, such as polypropylene, polyethylene and copolymers thereof.

In addition, the coating contains enough hydroxyl groups on its surface to react with the components of the polyurethane composition and develop a strong chemical bond.

As yet another advantage, the coated backing now has a surface free energy similar to that of the polyurethane which will further enhance adhesion of the nonwoven material to the surface of the polyurethane article.

DETAILED DESCRIPTION OF THE INVENTION

The nonwoven backing of a Velcro strip is coated with a composition consisting essentially of (in parts by weight)
- (a) 0.5 to 10 parts polyvinyl alcohol,
- (b) 15 to 60 parts organic polyisocyanate,
- (c) 1 to 15 parts plasticizer for polyvinyl alcohol, and
- (d) 0.05 to 0.5 parts tertiary amine catalyst.

Components (a)-(d) are preferably present as a mixture in 9.5 to 39.5 parts water.

The coated strip is heated for a sufficient time at a suitable elevated temperature to cure the coating composition. A suitable time and temperature would be 45 minutes at 120° F. although other times and temperatures can be used, for example, shorter periods at higher temperatures or longer periods at lower temperatures, such as 80° to 200° C. for 5 to 75 minutes.

While any polyvinyl alcohol is suitable for use in the coating composition according to the invention, the polyvinyl alcohols that are preferred are the fully hydrolyzed polyvinyl alcohols, i.e. those which are at least about 96 mole% hydrolyzed, preferably about 98–99.5-+mole% hydrolyzed and have a degree of polymerization ranging from 300 to 2000, especially about 600 to 1200. The composition should preferably contain 0.5 to 7.5 parts of the fully hydrolyzed polyvinyl alcohol.

Contemplated as the functional, or operative, equivalent of the polyvinyl alcohol for purposes of this invention is any material which is water-soluble and film-forming and has a plurality of active hydrogens, preferably a high degree of hydroxyl groups such as cellulose and its derivatives like hydroxyethyl cellulose, methyl cellulose and the like.

Examples of suitable organic polyisocyanates are hexamethylene diisocyanate, phenylene diisocyanate, toluene diisocyanate and 4,4'-diphenylmethane diisocyanate. Especially suitable are 4,4'-diphenylmethane diisocyanate and the 2,4- and 2,6-toluene diisocyanates, individually or together as their commercially available mixtures. Other especially suitable mixtures of diisocyanates are those known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanate and a polyether or polyester polyol. Especially desirable for the production of automotive foam cushions are the isocyanates normally used in high resilient polyurethane foam systems such as toluene diisocyanate 80/20 or 65/35; 4,4'-diphenylmethane diisocyanate and blends of toluene diisocyanates and 4,4'-diphenylmethane such as 75/25 or 80/20. The polyisocyanate is present preferably at 30 to 50 parts.

A catalytically effective amount of the catalyst is used in the coating composition. Any tertiary amine typically used to promote the urethane reaction between a hydroxyl group and an isocyanate group may be used in the coating composition preferably at 0.075 to 0.3 parts. Illustrative of suitable tertiary amines are triethylenediamine, trimethylamine, dimethylethylamine, dimethylethanolamine, triethanolamine, N-methyl morpholine, bis(dimethylaminoethyl)ether, tris(dimethylaminopropyl)amine, dimethylaminoethyl-N-methylethanolamine and the like.

Any material known to be a plasticizer for polyvinyl alcohol, such as dioctylphthalate, dibutylphthalate, dioctylsebecate, dibutylsebecate and the like may be used in amounts ranging from 1 to 15 parts, desirably 2 to 10 parts.

After the Velcro strip has been coated on the backside with the above-described coating composition and subjected to a suitable time/temperature curing cycle, the coated Velcro strip is appropriately positioned inside a preheated mold previously sprayed with a mold release composition as is well known in the art. The liquid polyurethane foam composition poured into the mold would comprise components typically used in the art to yield a foam product suitable for its intended use. Such compositions would contain suitable polyisocyanates as hereinbefore described, especially those used in high resilient foam compositions, suitable polyols, and suitable catalyst systems comprising tertiary amines and mixtures thereof, organotin compounds and mixtures thereof or mixtures of tertiary amines and organotin compounds. The compositions would also contain water or other suitable blowing agents and cell stabilizers such as silicone surfactants.

Illustrative of suitable polyols as a component of the polyurethane foam formulation are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds including diols and triols for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol and low molecular weight polyols.

Useful polyester polyols include those produced by reacting a dicarboxylic acid with an excess of a diol for example, adipic acid with ethylene glycol or butane diol, or reacting a lactone with an excess of a diol such as caprolactone and propylene glycol.

Other typical agents found in the polyurethane formulations include blowing agents such as water, methylene chloride, trichlorofluoromethane and the like, and cell stabilizers such as silicones.

The mold temperature and mold reaction time would be those typically used for the particular mold and polyurethane foam composition.

EXAMPLE 1

In Runs 1-3 the nonwoven (polyolefin) backside of a 4×1.75 inch Velcro strip manufactured by Velcro Corp. was coated with a coating composition using a wire wound rod (6–10 turns/inch to yield a coating of about 0.5 g/cm$^2$). The coating composition comprised 1.5 parts hydroxy-containing polymer as set forth in Table 1, 45 parts 4,4'-diphenylmethane diisocyanate, 3 parts dioctylphthalate, 0.1 parts triethylenediamine and 28.5 parts water. The coated strip was oven cured for 45 minutes at 250° F.

After coating the Velcro strip was allowed to return to ambient temperature and then placed in a preheated (150° F.) mold previously sprayed with mold release. A polyurethane foam composition comprising the following ingredients (parts by wt.) was poured into the mold:

|  | Parts |
|---|---|
| 6000 mol. wt. Polypropyleneoxide ethyleneoxide tipped triol | 60 |
| 6000 mol. wt. Polyurea filled polyol | 40 |
| Polyalkylene oxide methylsiloxane copolymer | 1.3 |
| Water | 4 |
| Diethanolamine | 1.5 |
| Triethylenediamine in dipropylene glycol (1:2) | 0.6 |
| Bis(dimethylamino ethyl) ether in dipropylene glycol (7:3) | 0.2 |
| Dibutyl tin dilaurate | 0.007 |
| Toluene diisocyanate 80/20 of 2,4/2,6 | 102 Index |

The rising foam flowed over the treated strip as it filled the closed mold. After 4 minutes the foam was removed from the mold and evaluated. The foam product produced in Run 1 showed the Velcro strip to have been firmly adhered to the foam product. The foam was cut around and under the strip disclosing a fine, uniform cell structure free of large coarse voids.

TABLE I

| RUN | HYDROXY-CONTAINING POLYMER | CHARACTER OF FOAM UNDER VELCRO STRIP |
|---|---|---|
| 1 | PVOH (98–99 mole % hydrolyzed) | fine, uniform cell structure; no large coarse voids |
| 2 | PVOH (98–99 mole % hydrolyzed) | fine, uniform in cell structure, small void at corner of strip |
| 3 | PVOH (98–99 mole % hydrolyzed) | fine, uniform in cell structure, small void at corner of strip |

STATEMENT OF INDUSTRIAL APPLICATION

The invention provides a method for attaching Velcro strips to automotive polyurethane foam pads without adversely affecting the foam's quality, load bearing and adhesion to the Velcro strips.

We claim:

1. In a method for making a molded polyurethane article having a material of low surface energy secured to the article's surface which comprises placing the low surface energy material on the internal surface of a mold, adding and curing a polyurethane composition in the mold and recovering the molded polyurethane article with the material attached to the surface of the article, the improvement which comprises coating the low surface energy material with a composition consisting essentially of a polyvinyl alcohol, an organic polyisocyanate and a catalyst for the urethane reaction, and curing the coating on the material prior to adding the polyurethane composition to the mold.

2. The method of claim 1 in which the coating composition also contains a plasticizer for the polyvinyl alcohol.

3. The method of claim 1 in which the coating composition consists essentially of the following ingredients in parts by weight:

0.5–10 parts polyvinyl alcohol
15–60 parts organic polyisocyanate
1–15 parts plasticizer for the polyvinyl alcohol, and
0.05–0.5 parts tertiary amine catalyst.

4. The method of claim 3 in which the coating composition is an aqueous composition containing 9.5–39.5 parts water.

5. The method of claim 1 in which the coated low surface energy material is cured at 80°–200° C. for 5–75 minutes.

6. The method of claim 1 in which the polyvinyl alcohol is a fully hydrolyzed polyvinyl alcohol.

7. The method of claim 1 in which the organic polyisocyanate is toluenediisocyanate or 4,4'-diphenylmethane diisocyanate.

8. The method of claim 1 in which the low surface energy material comprises polyethylene or polypropylene fibers.

9. The method of claim 8 in which the low surface energy material is a nonwoven.

10. In a method for making a molded polyurethane article having an attachment strip of molded teeth with a polyolefin backing secured to the surface of the article which method comprises placing the attachment strip in a mold with the teeth adjacent to the internal surface of the mold, adding and foaming a polyurethane composition in the mold and recovering the molded polyurethane article with the attachment strip secured to the surface of the article, the improvement which comprises coating the polyolefin backing of the attachment strip with a composition consisting essentially 0.5 to 7.5 parts fully hydrolyzed polyvinyl alcohol, 2–10 parts plasticizer for polyvinyl alcohol, 30–50 parts organic polyisocyanate, 0.075–0.3 parts tertiary amine catalyst for the urethane reaction, and 9.5–39.5 parts water and curing the coating on the polyolefin backing of the attachment strip prior to adding the polyurethane composition to the mold.

11. The method of claim 10 in which the polyvinyl alcohol is 98–99.5+ mole% hydrolyzed.

12. The method of claim 10 in which the plasticizer for polyvinyl alcohol is dioctyl phthalate.

13. The method of claim 10 in which the coated polyolefin backing is cured at 80°–200° C. for 5–75 minutes.

14. The method of claim 10 in which the organic polyisocyanate is toluene diisocyanate, 4,4'-diphenylmethane diisocyanate or mixtures thereof.

15. The method of claim 10 in which the polyolefin backing comprises polyethylene or polypropylene fibers.

16. The method of claim 10 in which the polyolefin backing is a nonwoven material.

17. In a method for making a molded polyurethane article having a molded teeth attachment strip with a polyolefin backing secured to the surface of the article which method comprises placing the attachment strip in a mold with the teeth adjacent to the internal surface of the mold, adding and foaming a polyurethane composition in the mold and recovering the molded polyurethane product with the attachment strip secured by its polyolefin backing to the surface of the article, the improvement comprising coating the polyolefin backing of the attachment strip with a composition consisting essentially of (in parts by weight) about 1.5 parts 98–99 mole percent hydrolyzed polyvinyl alcohol, about 45 parts 4,4'-diphenylmethane diisocyanate, 3 parts dioctyl phthalate, 0.1 parts triethylene diamine and 28.5 parts water, and curing the coating on the polyolefin backing of the attachment strip at a temperature of from 80°-200° C. for 5-75 prior to adding the polyurethane composition to the mold.

18. A molded polyurethane foam article having a material of low surface energy secured to the article's surface, the low surface energy material containing a cured coating composition, the coating composition consisting essentially of a polyvinyl alcohol, an organic polyisocyanate, a plasticizer for the polyvinyl alcohol and a catalyst for the urethane reaction.

19. The article of claim 18 in which the coating composition consists essentially of (in part by weight)
   0.5-10 parts fully hydrolyzed polyvinyl alcohol
   15-60 parts organic polyisocyanate
   1-15 parts plasticizer, and
   0.05-0.5 parts tertiary amine catalyst.

20. The article of claim 19 in which the low surface energy material is a polyolefin nonwoven.

21. The article of claim 20 in which the nonwoven is the backing of an attachment strip having molded teeth.

* * * * *

UNITED STATES PATENT AND TRADEMARK OFFICE
CERTIFICATE OF CORRECTION

PATENT NO.   :   4,717,611

DATED        :   5 January 1988

INVENTOR(S)  :   Robert G. Petrella and Michael Scarpati

It is certified that error appears in the above-identified patent and that said Letters Patent is hereby corrected as shown below:

Column 7, Line 2

After "5-75", insert --minutes--

Signed and Sealed this

Fourteenth Day of June, 1988

*Attest:*

DONALD J. QUIGG

*Attesting Officer*      *Commissioner of Patents and Trademarks*